United States Patent [19]
Juds et al.

[11] Patent Number: 5,418,359
[45] Date of Patent: May 23, 1995

[54] METHOD AND APPARATUS FOR DETECTING OBJECTS WITH RANGE-DEPENDENT BLOCKING

[75] Inventors: Scott Juds, Everett; Paul Mathews, Langley, both of Wash.

[73] Assignee: Auto-Sense, Limited, Denver, Colo.

[21] Appl. No.: 159,992

[22] Filed: Nov. 30, 1993

Related U.S. Application Data

[60] Continuation of Ser. No. 951,058, Sep. 25, 1992, abandoned, which is a division of Ser. No. 765,860, Sep. 26, 1991, abandoned, which is a division of Ser. No. 508,132, Apr. 10, 1990, Pat. No. 5,354,983.

[51] Int. Cl.⁶ ............................................. G01V 9/04
[52] U.S. Cl. ................................. 250/221; 250/222.1; 250/237 R
[58] Field of Search ............... 250/221, 222.1, 237 R, 250/216, 239; 340/555, 556, 557

[56] References Cited

U.S. PATENT DOCUMENTS

| | | |
|---|---|---|
| 2,099,764 | 11/1937 | Touceda . |
| 2,896,089 | 7/1959 | Wesch . |
| 3,011,580 | 12/1963 | Reid . |
| 3,210,548 | 10/1965 | Morrison . |
| 3,293,440 | 12/1966 | Mueller . |
| 3,369,124 | 2/1968 | Dueker . |
| 3,381,133 | 4/1968 | Barnes et al. . |
| 3,444,544 | 5/1969 | Pearson et al. . |
| 3,601,792 | 8/1971 | Murray . |
| 3,675,018 | 7/1972 | Paul . |
| 3,680,085 | 7/1972 | Del Signore . |
| 3,681,750 | 8/1972 | Larka . |
| 3,749,918 | 7/1973 | Jones . |
| 3,789,950 | 2/1974 | Strenglein . |
| 3,858,043 | 12/1974 | Sick et al. . |
| 3,858,043 | 12/1974 | Sick et al. . |
| 3,862,404 | 1/1975 | Fiedrich . |
| 3,873,836 | 3/1975 | Greene . |
| 3,891,966 | 6/1975 | Sztankay . |
| 3,892,483 | 7/1975 | Saufferer . |
| 3,922,629 | 11/1975 | Hayakawa . |
| 3,983,395 | 9/1976 | Kim . |
| 3,989,946 | 11/1976 | Chapman et al. . |
| 3,996,599 | 12/1976 | King . |
| 4,015,117 | 3/1977 | Wicklund, Jr. . |
| 4,026,654 | 5/1977 | Beaurain . |
| 4,028,662 | 6/1977 | Young . |
| 4,029,957 | 6/1977 | Betz et al. . |
| 4,029,957 | 6/1977 | Betz et al. . |
| 4,029,962 | 6/1977 | Chapman . |
| 4,038,633 | 7/1977 | King . |
| 4,072,864 | 2/1978 | von Gutfeld . |
| 4,174,177 | 11/1979 | Gardner et al. . |
| 4,207,466 | 6/1980 | Drage et al. . |
| 4,219,837 | 8/1980 | Sluis et al. . |
| 4,225,791 | 9/1980 | Kompelien . |
| 4,242,706 | 12/1980 | McCormack et al. . |
| 4,260,980 | 4/1981 | Bates . |
| 4,278,962 | 7/1981 | Lin . |
| 4,290,043 | 9/1981 | Kaplan . |
| 4,306,147 | 12/1981 | Fukuyama et al. . |
| 4,339,748 | 7/1982 | Guscott et al. . |
| 4,354,106 | 10/1982 | Walter . |
| 4,365,896 | 12/1982 | Mihalow . |
| 4,366,377 | 12/1982 | Notthoff et al. . |
| 4,382,291 | 5/1983 | Nakauchi . |
| 4,383,238 | 5/1983 | Endo . |
| 4,404,541 | 9/1983 | Kodera et al. . |
| 4,404,541 | 9/1983 | Kodeera et al. . |
| 4,423,325 | 12/1983 | Foss . |
| 4,435,093 | 3/1984 | Krause et al. . |
| 4,443,701 | 4/1984 | Bailey . |
| 4,447,800 | 5/1984 | Kasuya et al. . |
| 4,450,430 | 5/1984 | Barishpolsky et al. . |
| 4,467,313 | 8/1984 | Yoshino et al. . |

(List continued on next page.)

FOREIGN PATENT DOCUMENTS

| | | |
|---|---|---|
| 2160885 | 11/1972 | France . |
| 2131642 | 11/1973 | United Kingdom . |
| 2081547 | 7/1981 | United Kingdom . |

*Primary Examiner*—David C. Nelms

[57] ABSTRACT

A method and apparatus are disclosed which allow for the detection of an object (14) by the generation of a radiated beam (18) and a subsequent reflection by the object (14) of a portion (20) thereof. The detection of particulate object material (16) due to a reflection of a portion (22) of the generated beam (18) is minimized.

15 Claims, 8 Drawing Sheets

U.S. PATENT DOCUMENTS

| | | |
|---|---|---|
| 4,467,342 | 8/1984 | Tower . |
| 4,479,053 | 10/1984 | Johnston . |
| 4,500,977 | 2/1985 | Gelhard . |
| 4,524,356 | 6/1985 | Kodera et al. . |
| 4,528,563 | 7/1985 | Takeuchi . |
| 4,531,055 | 7/1985 | Shepherd, Jr. et al. . |
| 4,550,250 | 10/1985 | Mueller et al. ............... 250/221 |
| 4,572,953 | 2/1986 | Elliott et al. . |
| 4,582,279 | 4/1986 | Pontier . |
| 4,625,113 | 11/1986 | Zierhut . |
| 4,626,849 | 12/1986 | Sims . |
| 4,636,980 | 1/1987 | Bluzer . |
| 4,636,996 | 1/1987 | Tsuji . |
| 4,674,073 | 6/1987 | Naruse . |
| 4,691,107 | 9/1987 | Elliott et al. . |
| 4,692,618 | 9/1987 | Klatt . |
| 4,694,295 | 9/1987 | Miller et al. . |
| 4,733,098 | 3/1988 | Sieto et al. . |
| 4,737,625 | 4/1988 | Sasaki et al. . |
| 4,757,450 | 7/1988 | Etoh . |
| 4,760,381 | 7/1988 | Haag . |
| 4,766,421 | 8/1988 | Beggs et al. . |
| 4,788,439 | 11/1988 | Hardy et al. . |
| 4,788,439 | 11/1988 | Hardy et al. . |
| 4,825,211 | 4/1989 | Park . |
| 4,849,731 | 7/1989 | Melocik . |
| 4,891,624 | 1/1990 | Ishikawa et al. . |
| 4,926,170 | 5/1990 | Beggs et al. . |
| 4,926,171 | 5/1990 | Kelley . |
| 4,980,869 | 12/1990 | Forster et al. . |
| 4,990,890 | 2/1991 | Newby . |
| 4,994,800 | 2/1991 | Milliken . |
| 4,998,104 | 7/1990 | Dombrowski . |
| 5,014,200 | 5/1991 | Chundrlik et al. . |
| 5,025,516 | 6/1991 | Wilson ............................ 250/221 |
| 5,028,920 | 7/1991 | Dombrowski . |
| 5,039,217 | 8/1991 | Maekawa et al. . |
| 5,045,856 | 9/1991 | Paoletti . |
| 5,053,979 | 10/1991 | Etoh . |
| 5,059,946 | 10/1991 | Hollowbush . |
| 5,074,488 | 12/1991 | Colling . |
| 5,083,125 | 1/1992 | Brown et al. . |
| 5,122,796 | 6/1992 | Beggs et al. . |
| 5,138,150 | 8/1992 | Duncan ........................ 250/222.1 |

RANGE - FEET

METHOD AND APPARATUS FOR DETECTING OBJECTS WITH RANGE-DEPENDENT BLOCKING

This application is a continuation of applicants' application Ser. No. 07/951,058 filed Sep. 25, 1992, now abandoned which is a divisional of application Ser. No. 07/765,860, filed Sep. 26, 1991, now abandoned, which is in turn a divisional of application Ser. No. 07/508,132, filed Apr. 10, 1990, now U.S. Pat. No. 5,354,983.

BACKGROUND OF THE INVENTION

1. Field of the Invention

This invention relates to a method and apparatus for the detecting of objects, and more particularly to a method and apparatus which detects objects and provides a detecting signal in response thereto, while minimizing the generation of such a detection signal in response to various objects which may proximately reside near the detector apparatus.

2. Discussion

Object detection systems are used in a wide variety of applications, including that associated with collision avoidance. In collision avoidance systems, these object detectors are usually mounted upon the body of a moving vehicle and are made to generate a beam of radiation such that the generated beam is caused to strike a close object and be reflected back to the object detector. The receipt of this reflected beam of generated radiation then usually causes the object detector to produce an amplified signal to the operator of the vehicle warning the operator that an object is close by. These object detectors have usually defined a modifiable threshold detection distance which defined the distance an object had to be from the detector in order to be detected. This threshold distance was modifiable up to an upper limit defined by the constraints associated with the elements of the detector.

While these object detector systems have proven to be invaluable in the operation of motorized vehicles, there have been a substantial number of drawbacks associated therewith. Perhaps the largest drawback associated with these object detectors, as used within collision avoidance systems, is that these object detectors have been seen to issue many false warnings to the operators of these motor vehicles causing undue alarm and improperly interfering with the operator's attention, thereby increasing the possibility of accidents due to abrupt stops or diverted attention. These false detecting signals have usually been the result of the reflection of the generated beam by suspended particulates (i.e., snow, fog, rain, or other forms of atmospheric precipitation) which usually lies in close proximity to the object detector between the object detector and the object to be detected, and which causes a reflection of a generated beam back to the detector and causing a false indication of the closeness of the object thereto.

A closely related drawback associated with the object detectors as used in collision avoidance systems is that the ability to detect a closely positioned object is highly determinative of the amount of radiation which is reflected back to the object detector. That is, it has been found that these object detectors have had a great deal of difficulty in detecting very dark objects, since these dark objects absorb much of the radiated energy which is generated from the object detectors and which causes only a very small amount of this energy to be reflected back thereto. This drawback has been overcome, in many instances, by the use of increased amplification or gain (i.e. referred to as "Excess Gain") by the detector. This Excess Gain increases the amplitude of the signal produced by the detector in response to the received reflected beam of radiation.

While this Excess Gain has increased the ability of the object detector to detect very dark objects, it has further amplified the problem associated with the generation of false detection signals by the particulate material which is present in close proximity to the object. That is, this Excess Gain decreases the threshold amount of sensitivity needed by the detector in order for the detector to generate a detection signal, thereby increasing the probability of a false detection signal. The present invention is then directed to overcome substantially all of the deficiencies as stated above.

SUMMARY OF THE INVENTION

In accordance with one aspect of the present invention, an object detector is provided for detecting the presence of an object, having a defined threshold detector distance associated therewith, the object reflecting a beam of radiation therefrom and being remotely located a distance from the object detector, the object detector having a detecting apparatus for receiving the beam of radiation of the object and for generating a detecting signal in response thereto and further having an suppressing apparatus, which is coupled the detecting apparatus for suppressing the detecting signal if the object is located within a predetermined distance, being less than said defined threshold detection distance, from the object detector.

In a second aspect of the present invention, a method is provided for detecting the presence of an object, the object reflecting a beam of radiation therefrom and being remotely located a distance from the object detector, the method comprising the steps of: acquiring the beam of radiation of the object; defining a threshold detection distance of said object detector; determining the distance of the object from the object detector; and generating a detection signal in response to the acquired beam of radiation only if the determined distance is greater than a predetermined distance value, said predetermined distance being less than said defined threshold detection distance.

These and other aspects, features, advantages and objects of this invention will be more readily understood by reviewing carefully the following detailed description in conjunction with the accompanying drawings and subjoined claims.

BRIEF DESCRIPTION OF THE DRAWINGS

For a more complete understanding of the present invention relative to the advantages thereof, reference may be made to the following detailed description taken in conjunction with the accompanying drawings, in which:

FIG. 18c is a perspective view of a second form of the mounting element shown generally in FIG. 18a;

FIG. 18e is a plan view of the mounting element shown generally in FIG. 18a.

DETAILED DESCRIPTION OF THE PREFERRED EMBODIMENTS

Figure 1:
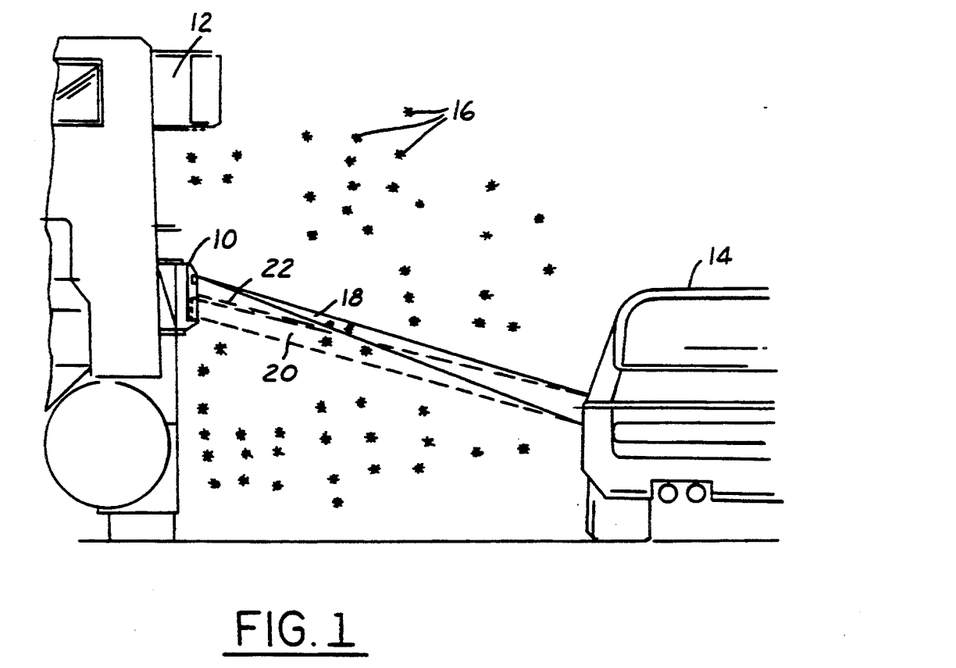
FIG. 1 is a plan view of a motor vehicle which is equipped with an object detector made in accordance with the teachings of the preferred embodiment of this invention and used in a collision avoidance configuration.

Referring now to FIG. 1, there is shown an object detector 10 made in accordance with the teachings of the preferred embodiment of this invention and mounted upon a motor vehicle 12 such that the object detector 10 may detect a relatively close object, such as automobile 14, and inform the operator (not shown) of the motor vehicle 12 of the relatively close location thereof. This detection is accomplished in order to reduce the probability of a collision between motor vehicle 12 and the object 14. Also shown in FIG. 1 is a plurality of particulate objects 16 which are typically interposed between the object to be identified 14 and the object detector 10. This particulate object material 16 may comprise snow, fog, rain, mist or various other forms of known atmospheric particulate material.

Specifically, in order for the object detector 10 to detect the occurrence of automobile 14 and to inform the operator of the vehicle 12 of its position, object detector 10 is made to generate one (or alternatively a plurality of) radiation beams 18 and to direct these beams to the object 14 to be detected. Object 14 then reflects a portion 20 of each of the beam 18 back to the object detector 10. The object detector 10, upon receiving the beam portion 20 of the generated beams 18, then provides a detecting signal to the operator of the vehicle 12 advising this operator of the relatively close location of the motor vehicle 14. The generation of such a detecting signal is dependent upon the relative received intensity of the reflected beam portion 20, and the reflected beam portion is comprised of reflections from various portions of the object 14.

If the motor vehicle 14 is within a relatively close distance from vehicle 12, then the reflected portion 20 of the beam 18 is relatively high in intensity, even if the motor vehicle 14 is of a relatively dark color. That is, should the reflected beam portion 20 be relatively high in intensity, then the object detector 10 will produce a detecting signal to the operator of the vehicle 12 indicating to this operator that the object 14 is relatively close thereto. However, if the reflected beam portion 20 is of a relatively low intensity, then the object detector 10 will not inform the operator of the vehicle 12 of the location of the vehicle 14 since the vehicle 14 is relatively far away from the vehicle 12.

This generation of beam 18 and the subsequent reflection of beam portion 20 has been found to work satisfactorily in many instances when used for the detection of objects 14 for collision avoidance purposes. However, it has been found that this interposed particulate object material 16 also reflects a certain portion 22 of the generated beam 18 as well. This reflected beam portion 22 may be at a relatively high intensity since the particulate object material 16 is relatively close to the object detector 10 which is relatively highly reflective. Since the overall gain of the object detector 10 is usually increased in order to detect dark-colored objects, the reflections from objects 16 is made even more effective in causing the generation of the detection signal.

This reflective beam portion 22 may then be at a high enough intensity upon receipt by the object detector 10 to cause the object detector 10 to generate a detecting signal to the operator of the vehicle 12, informing this operator of the relatively close location of an object to be avoided. This false detection by the plurality of particulate objects 16 which are interposed between the object detector 10 and the vehicle or object to be detected 14 could create a false detecting signal by object detector 10. For this reason, the object detector 10 made in accordance with the teachings of the preferred embodiment of this invention will ignore or negate the beam portions 22 which are reflected by the plurality of particulate objects 16 as shown in FIG. 1. This ignoring or negation of the reflected beam portion 22 then provides for a more reliable and error-free generation of detecting signals from the object detector 10 to the operator of vehicle 12.

Figure 3:
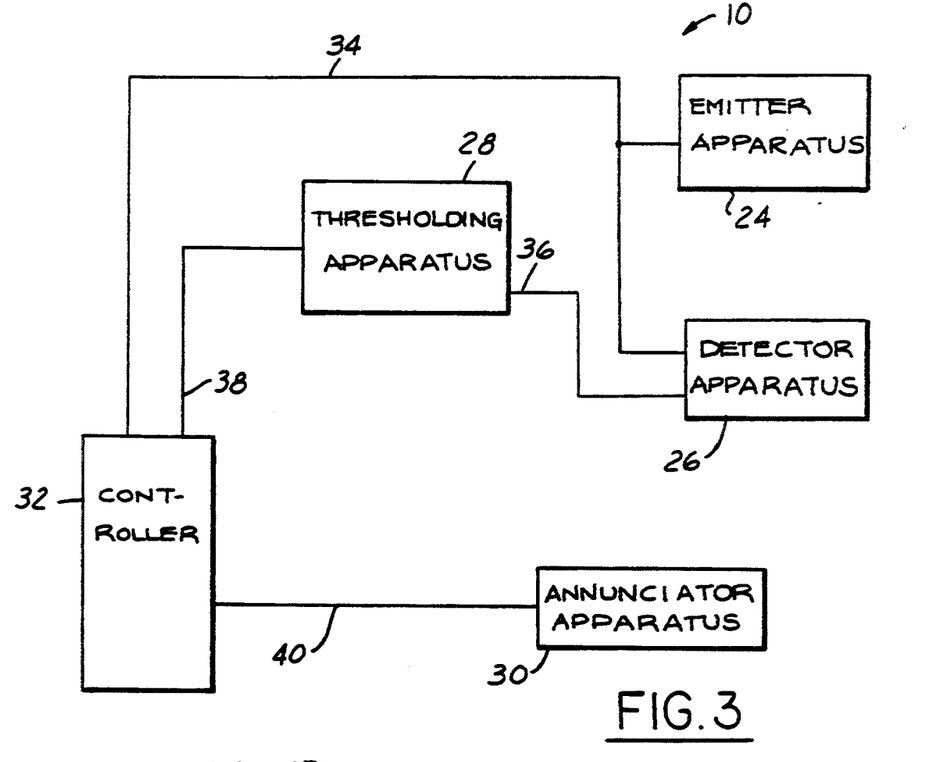
FIG. 3 is a block diagram of the object detector shown in FIG. 1.

Referring now to FIG. 3, there is shown the object detector 10 made in accordance with the teachings of the preferred embodiment of this invention and containing an emitter apparatus 24, a detector apparatus 26, a thresholding apparatus 28, an annunciator apparatus 30 and a controller 32. Specifically, the emitter apparatus 24 and the detector apparatus 26 are coupled to the controller 32 by bus 34 while the detector apparatus is further coupled to the thresholding apparatus by bus 36. The controller 32 is coupled to the thresholding apparatus 28 by bus 38, while the controller is further coupled to the enunciator apparatus 30 by bus 40.

In operation, the emitter apparatus 24 emits or generates the beam 18 as shown in FIG. 1. The detector apparatus then receives the beam portions 20 or 22 and provides a detecting signal output upon bus 36 to the thresholding apparatus 28. This signal on bus 36 which is generated by the detector apparatus 26 is substantially associated with the sensitivity of the detector apparatus 26 and has a certain value which is closely associated therewith. That is, the received beam portions 20 or 22 is only detected if the detector sensitivity is such that the portions 20 or 22 are received by the detector apparatus 26. The use of the sensitivity of detector 26 will be discussed later.

The thresholding apparatus 28 then determines the relative value of the signal on bus 36 and compares it against a predetermined threshold value. If this value associated with a signal on bus 36 is greater than or equal to this threshold value, then the thresholding apparatus emits an acknowledgement signal upon bus 38 to the controller 32 which is indicative of the relatively close location of an object such as automobile 14 in FIG. 1. In this manner, the detection signal on bus 36 may be suppressed or blocked in a manner to be discussed later. Upon receiving the signal on bus 38, the controller 32 then issues a signal onto bus 40 which is directed to the annunciator apparatus 30. This signal on bus 40 then provides for a visual, audio, or other sort of indication to the operator of the motorized vehicle 12 that an object has been detected by the detector 10. The controller 32 is further coupled to the emitter apparatus and the detector apparatus 26 by bus 34 in order to allow control thereof.

Figure 2:
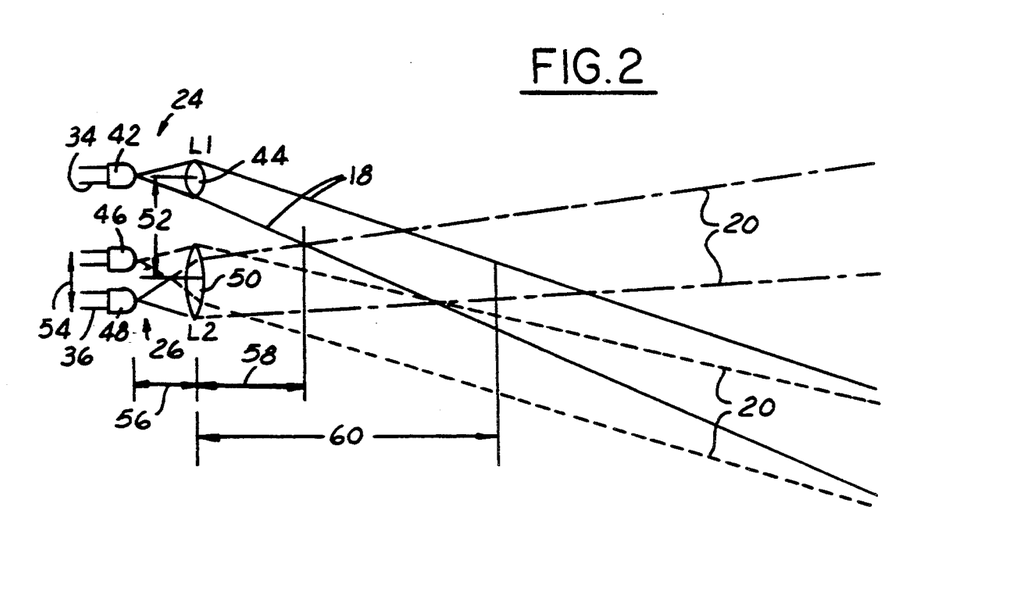
FIG. 2 is a diagrammatic view of the lenses, radiation generator, and radiation detector used by the object detector generally shown in FIG. 1.

Referring now to FIG. 2, there is shown the emitter apparatus 24 and the detector apparatus 26. Specifically, the emitter apparatus 24 contains in one embodiment a light-emitting diode 42 and a lens 44. In the preferred embodiment of this invention, the light-emitting diode 42 emits a beam 18 of infrared radiation through lens 44. The light-emitting diode 42 may be powered by bus 34 and is under the control of controller 32 through bus 34. The detector apparatus 26 contains in one embodiment, photosensors 46 and 48. A beam portion 20 is received or acquired by lens 50 and is directed to a single one of the photosensors 46 whereby an image of the reflected object is impressed thereon. A second beam portions 20 reflected from another area of the object 14 or from one of the objects 16 are also received by lens 50 and are impressed upon the photosensor 48.

Further, it can be seen that the lenses 44 and 50 are separated by a distance 52 and that the photosensors 46 and 48 define a distance 54 which is the largest longitudinal distance associated with any two points, one point being on photosensor 46 and the other point being on photosensor 48. Further, distance 56 defines the shortest distance from each of the photosensors 46 and 48 to the midpoint of the lens 50. Distances 58 and 60 define a range of distances associated within which the object 14 can be detected by the object detector 10. That is, photodetector 46 produces a signal onto bus 36 having a first polarity upon receipt of an image defined by beam portions 20. Additionally, the photodetector 48 produces a signal onto bus 36 having a different polarity from that of the signal produced by photodetector 46 when the photodetector 48 receives an image signal through beam portions 20. If the object 14 is placed at a distance 60 or greater away from the lens 50, then the signal on bus 36 produced by the photosensor 46 is at a higher level than that of the signal produced by the photosensor 48. Should an object such as 14 reside between the distances 58 and 60, then both of the photosensors 46 and 48 will produce a corresponding signal having opposite polarity upon the bus 36 to the thresholding apparatus 28.

Figure 4:
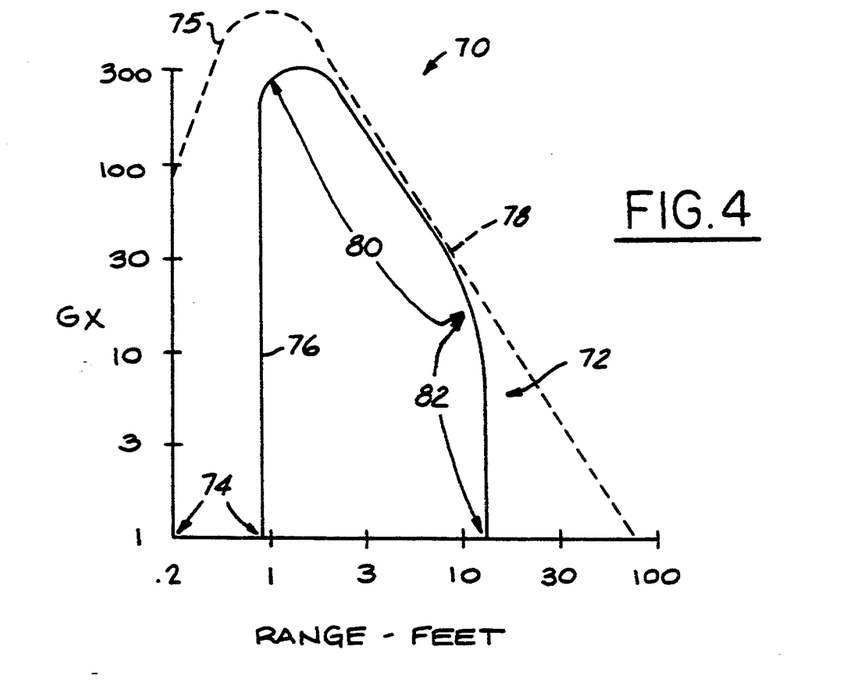
FIG. 4 is a graphical illustration of the relationship of the Excess Gain and the range associated with an object detector of the prior art.

In order to fully understand the principles of this invention, reference is now made to FIG. 4 which shows graphs 70 and 72 which relates the Excess Gain of the photosensors 46 and 48 to a range of distances associated with the placement of an object 14 to be detected according to the principles of the prior art. Generally, when the separation between the lenses 44 and 50, defined as distance 52, is negligible, then the Excess Gain associated with an object within the distance defined by 74 is as shown in portion 75 of the associated graph 70, since the beam 18 and the detector field of view associated with lens 50 begin to intersect one another almost immediately and the Excess Gain increases dramatically. When the distance 52 is larger, as shown in graph 72, it take some distance from the lens defined as 58 before the beam 18 and the detector field of view associated with the lens 50 overlap, so that an object may be detected. That is, an object must both be illuminated by the beam 18 and in the field of view associated with lens 50 in order to be detected. Therefore, the Excess Gain in graph 72 is zero for the distance range 74. However, as soon as the beam 18 and the field of view overlap, the Excess Gain curve rises rapidly and is denoted by that portion of graph 72 marked 76.

The portions 78 and 80 of curves 70 and 72 respectively demonstrate the fact that the sensitivity of the detectors 46 and 48 diminishes relative to the inverse square of the distance between the object 14 and the lens 50. If, however, both of the photosensors 46 and 48 produce a signal in response to the projected image thereon which is of opposite polarity, then portion 82 of curve 72 results and demonstrates that at relatively long ranges (i.e., those beyond distance 60) there is no detection of the object by the photodetectors 46 and 48 because the signal received by the detector 46 is larger than that received by the detector 48 as shown in FIG. 2. That is, more of the reflections of the beam 18 will occur upon detector 46 than on detector 48 when the object is moved beyond distance 60. These Excess Gain characteristic curves therefore allows one to sculpture the Excess Gain response to eliminate the false detection produced by the plurality of particulate objects 16 and is used in the object detector 10 of the preferred embodiment of the present invention.

Figure 5:
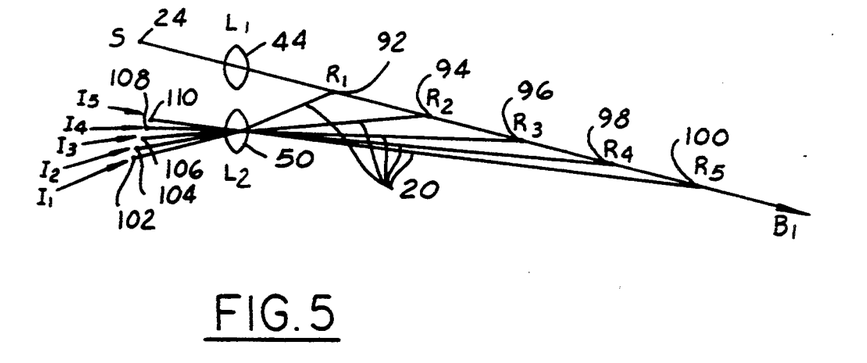
FIG. 5 is a diagrammatic illustration of the reflections produced by various objects placed within the path of the emitted radiation from the object detector of the preferred embodiment of this invention.

To further see how the object detector 10 of the preferred embodiment utilizes this sculpturing of the Excess Gain curves 70 and 72 to eliminate unwanted detections occurring by the plurality of particulate or other related objects 16, reference is now made to FIG. 5 which shows the relative deployment of lenses 44 and 50 and the emitter apparatus 24. Specifically, at various distances from the lens 50 (or alternatively from lens 44), an object produces a reflected portion 20 of the beam 18 to the lens 50. The lens 50 then directs the received image beam portion 20 and directs this beam portion to a specific spatial location which is dependent upon the distance that the object is away from either lens 44 or lens 50. That is, an object's distance away from lens 50 (or alternatively lens 44) is uniquely associated with the placement of the received image by lens 50. This is clearly shown in FIG. 5 where object distances 92, 94, 96, 98 and 100, each defining a unique distance away from lens 44 (or alternatively lens 50) cause the creation by lens 50 of respective images 102, 104, 106, 108 and 110, each having a unique spatial placement associated therewith. It should be noted that object distance 100 defines the farthest distance that the object detector 10 may detect an object 14 within. This threshold distance may be increased (to a limiting detection distance) or decreased by use of the detectors 46 and 48 by known techniques. Detectors 46 and 48 impose some upper limit on the threshold detection distance. This unique spatial placement associated with the distance away from either lens 44 or lens 50 of an object is used by the object detector made in accordance with the teachings of the preferred embodiment of this invention in order to diminish the false detection associated with the plurality of particulate objects 16 and to sculpture the Excess Gain characteristic of the object detector of the preferred embodiment of this invention.

Figure 6:
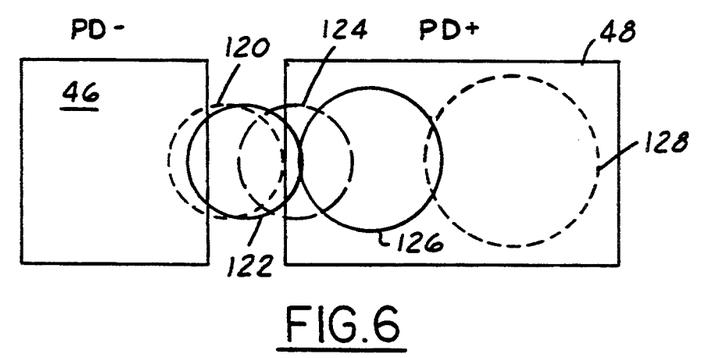
FIG. 6 is a diagrammatic illustration of the movement of an acquired image across the detector portion of the object shown in FIG. 1.

To see the relationship between the unique placement of the images associated with an object (such as automobile 14) by lens 50 and the Excess Gain curves 70 and 72, reference is now made to FIG. 6 which shows photosensors 46 and 48 and received images 120, 122, 124, 126 and 128. Specifically, the further an object moves away from lens 44, the closer its corresponding image comes to photosensor 46. That is, image 120, in FIG. 6, is associated with an object which is relatively far away from the lens 44 and has a distance corresponding to portion 82 of graph 72. Image 128, however, is associated with an object which is relatively close to lens 44 and has a range associated therewith which corresponds to portions 76 of graph 72. Images 122-126 are all associated with objects varying between the distances defined by images 128 and 122. The greater the area covered by an image 120-128 upon an individual photosensor 46 or 48, the larger is the resultant produced signal therefrom. Given the known inverse square relationship between the distance associated with an object, the degradation of the Excess Gain signals as shown by graphs 70 and 72 and the movement of an object's image across detectors 46 and 48 due to varying the distance of that object from lens 44, one may alter or control the sensitive area which is hit or excited by the image spot as a function of the distance away from the corresponding object. This not only allows one to define a threshold detection distance (i.e. a furthest distance that the object detector 10 may detect an object within but also allows one to sculpture the Excess Gain associated with the detector apparatus so as to decrease the probability of false detection signals being generated.

Specifically, the Excess Gain of a photoelectric sensor (such as 46 or 48) can be computed by a convolution integral of the following form and is usually defined to be a measure of the ratio of the available signal (from the detectors 48 and 46) to a threshold value for a reference target as a function of distance:

$$G_x(R) = \frac{K}{R^2} \int_{-\infty}^{\infty} S(y)I(y,R)dy$$

$$\text{where: } K = R_{max}^2 \left[ \int_{-\infty}^{\infty} I(y, R_{max})dy \right]^{-1}$$

and where:

$R_{max}$ = maximum distance range that allows the sensor 48 to detect a 90% white diffuse reflecting target with all the receive light from the beam 18 impinging upon detector 48.

$S(y)$ = sensitivity function of the combination of photosensors 46 or 48

$I(y,R)$ = intensity function of the image spot for a target at a fixed range distance R In order to calculate the function $I(y,R)$, we first need to find a function for $I(y,R_{max})$. Assuming that the target or the object such as 14 is always in the far field of the lens 50, that is, the distance between the object to be detected and the lens 50 is greater than ten focal lengths, then the shape dependency within $I(y,R_{max})$ is eliminated. Also, given that lenses 44 and 50 are substantially identical, then the image diameter will be substantially the same as the source diameter. Assuming that a light-emitting diode 42 is mounted in a reflecting dish and used as a source of radiation and this reflecting dish has a diameter of "d," then the intensity function $I(y,R_{max})$ is approximated by the following:

$$I(y) \approx \cos\left(\frac{\pi y}{d}\right)\Big|_{-d/2}^{d/2}, \text{ 0 elsewhere}$$

Now assuming that $R_{max} \approx 1000"$ and $d \approx 0.090"$, we can calculate that $K \approx 10^6$. Since all of the light associated $I(y)$ is capturable, then the integral from negative infinity to positive infinity of $I(y)dy$ is approximately equal to 1. Additionally, we know that $$\text{distance 54} \approx \frac{(\text{distance 56})(\text{distance 52})}{R}$$

Therefore, $$I(y,R) \approx \cos\left[ \pi y/d - \frac{(\text{distance 56})(\text{distance 52})}{R} \right]$$

from the limits defined by:

$$d \times \frac{(\text{distance 56})(\text{distance 52})}{\pi/R} + d/2$$

$$d \times \frac{(\text{distance 56})(\text{distance 52})}{\pi/R} - d/2 \text{ and 0 elsewhere}$$

Figure 7:
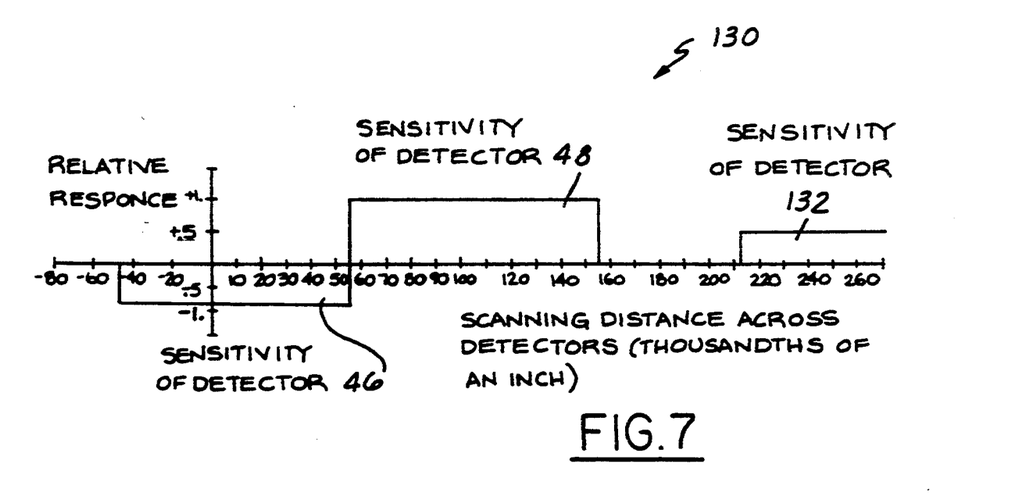
FIG. 7 is a graphical illustration of the sensitivity associated with the detecting portion of the object detector shown in FIG. 1.

To further understand the teachings of this invention, we next need to determine the sensitivity associated with photodetectors 46 and 48. Referring now to FIG. 7, there is shown a graph 130 showing the relative response of the various detectors 46 and 48 relative to the spatial distance across the detector combination. As can be seen, detector 48 produces a signal having a positive polarity, in one embodiment of this invention, when detector 48 receives an image from lens 50, while detector 46 produces a signal having a substantially negative polarity when receiving the same image from lens 50. Both the signals from detectors 46 and 48 appear upon bus 36 to the thresholding apparatus 28. Additionally, as shown in graph 130, there may be additional detectors such as detector 132 which may be used in conjunction with the system. The use of such additional detectors is described herein later. It has been found that the strategic placement of the detectors 46 and 48 in the manner shown has allowed for the sculpturing of the associated Excess Gain characteristics such that the unwanted detection of objects 16 is substantially eliminated.

Figure 8:
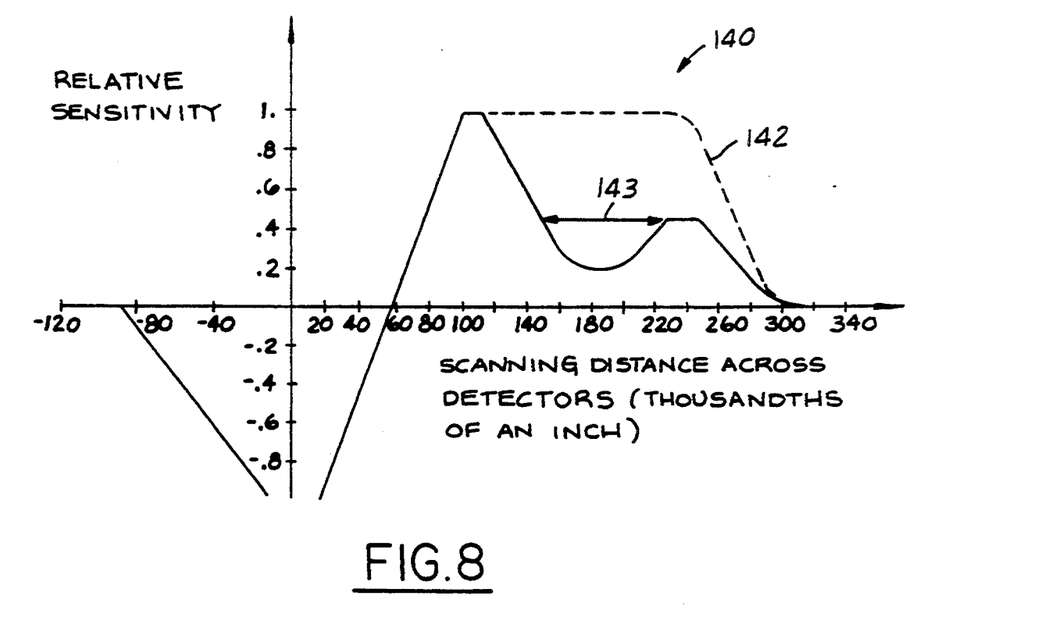
FIG. 8 is a graphical illustration of the mathematical convolution of the sensitivity graph shown in FIG. 7 and of the intensity of the reflected radiation received by the object detector shown in FIG. 1.

Referring now to FIG. 8, there is shown a graph 140 comprising the graphical convolution of the sensitivity of the detector combination 46 and 48 as shown in FIG. 7 and the previously calculated intensity function denoted as I(y,R). Graph 140 illustrates the relative sensitivity of the detector apparatus 46 and 48 relative to the distance scanned across the individual detectors. Graph portion 142, shown in phantom, denotes the convolution graph if a single large detector, instead of two detector generating signals of opposite polarity, is used. As can be seen, the relative sensitivity of the detector apparatus 26 is decreased for a certain range of distances 143 in close proximity to the object detector 10. This decrease allows or the suppression of the detection signal from the detector apparatus 26.

Figure 9:
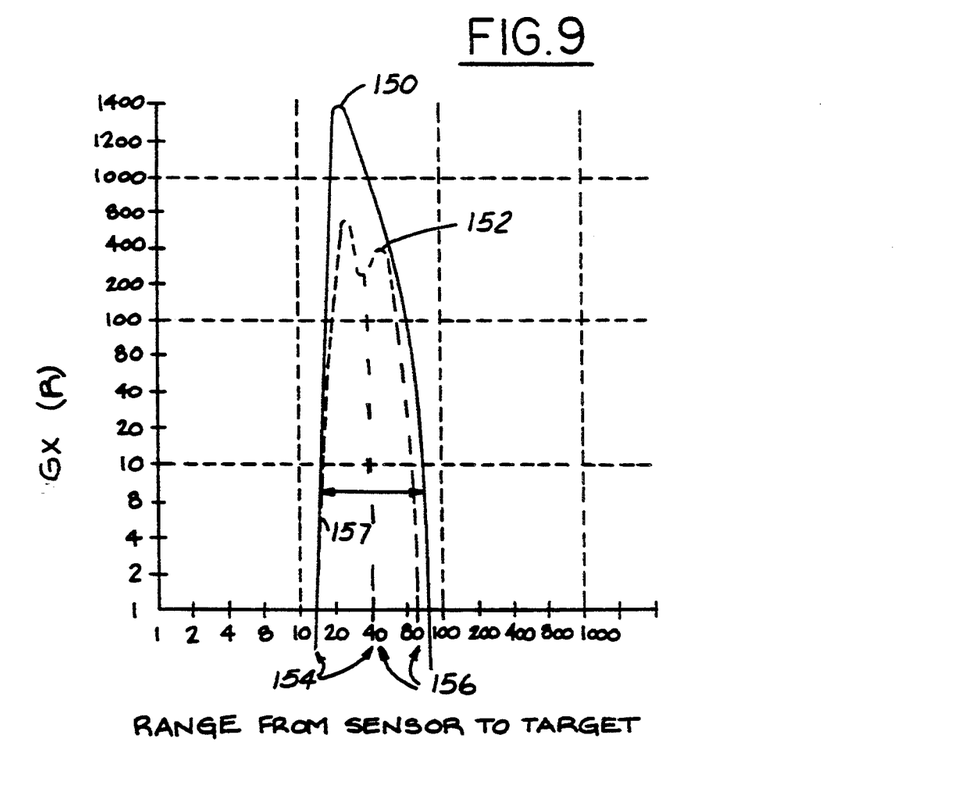
FIG. 9 is a graphical illustration of the relationship of the Excess Gain and the range associated with the object detector shown in FIG. 1.

Referring now to FIG. 9, there is shown Excess Gain graphs 150 and 152 which relate the Excess Gain of the detector apparatus 26 to a distance that a detected object (such as automobile 14) is away from the object detector 10 wherein the detector apparatus 26 has a sensitivity substantially similar to that shown in FIG. 7. Graph 152 is obtained by multiplying graph 140 (excluding portion 142) by the previously calculated intensity function of the image which was denoted as I(y,R). Graph 150 is a result of this operation upon the graph 140 having portion 142 and denoting a single large detector. It should be evident of ordinary skill in the art that graph 152 provides a decreased Excess Gain at a relatively close range 154 relative to object detector 10 and also provides an increased Excess Gain at a range 156 thereafter. Both ranges 154 and 156 are within the detection range 157. The use of a single large detector does not allow for this sculpturing or decrease in Excess Gain at relatively close ranges to object detector 10 and an increase of gain thereafter within the detection range defined as 157.

This decrease in Excess Gains associated with the range 154 increases the reliability of the detection signal produced by the object detector 10. This is due to the fact that the plurality of particulate objects 16 is relatively closely placed to the object detector and produces a reflected beam portion 22 therefrom. By decreasing the Excess Gain in this small range, one may prevent these objects 16 from causing detector 10 to produce a detecting signal. At the same time, however, an object that is desired to be detected within the range defined by range 154 will be detected since it is more highly reflective than is the individual particular object material 16 and therefore even under reduced Excess Gain conditions will be detected by the object detector 10. The use of a single detector, such as taught by the prior art having a single detection signal of a given polarity, provides no sculpturing, in this manner, and produces little safeguards against false detection caused by the plurality of particulate objects 16.

Figure 10:
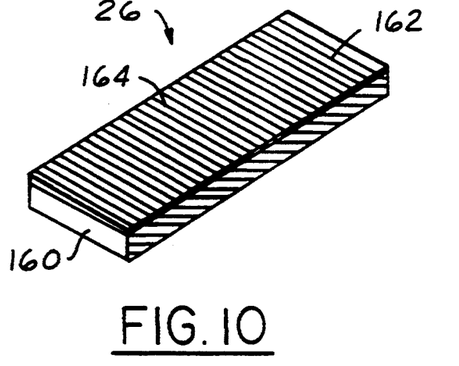
FIG. 10 is a first alternative embodiment of the detector portion of the object detector shown in FIG. 1.

Referring now FIG. 10, an alternative embodiment of the detector apparatus 26 is shown. Specifically, a single large detector 160 may be utilized while still having the sculptured arrangement as shown in FIG. 9. Specifically, a variable optical density filter 162 is placed upon the image-receiving surface 164 of the detector 160. This variable optical density filter 162 blocks some of the reflected light beam portions 22 (i.e. those from the plurality of particulate objects 16). This use of the filter 162 reduces the sensitivity of the photodetector 160 to the object 16, thereby producing a reduced Excess Gain to certain portions of the reflected light. That is, the sensitivity of the detector 160 is substantially reduced relative to the plurality of particulate objects 16 which reside in a relatively close range to the photodetector 160 while providing only a slight reduction in the overall sensitivity to rather largely reflective objects located at a greater distance therefrom. This causes the sculpturing of the associated Excess Gain.

Figure 11:
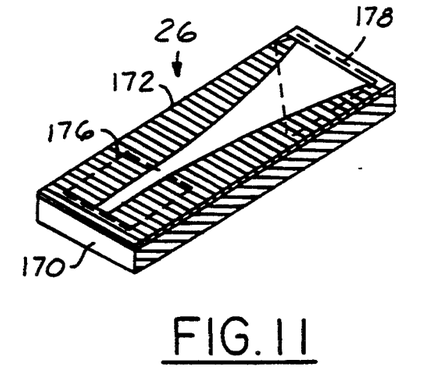
FIG. 11 is a second alternative embodiment of the detector portion of the object detector shown in FIG. 1.

Referring now to FIG. 11, a third embodiment of the sculptured detector apparatus 26 used by the object detector 10 is shown as containing a single photodetector 170 upon which a mask 172 is placed upon the image-receiving portion 174. This mask may be of a variety of geometric shapes, but its purpose is to reduce the area associated with surface 174 in a location 176 corresponding to the acquisition or the reception of an image which corresponds to an object which is relatively close to the object detector 10. The placement of this mask in location 176 then reduces the sensitivity of the detector 170 to these relatively close objects. The mask 172 further allows a relatively large area of the photodetector 170 to be exposed to an acquired image at a location such as 178 which corresponds to the acquisition or reception of an image associated with an object which is relatively far from the object detector 10. This would allow for a degradation and a loss of sensitivity of the photodetector 170 to objects within this range. The use of mask 172 then allows for the sculpturing of the Excess Gain curve in a range such as 154 associated with FIG. 9.

Figure 12:
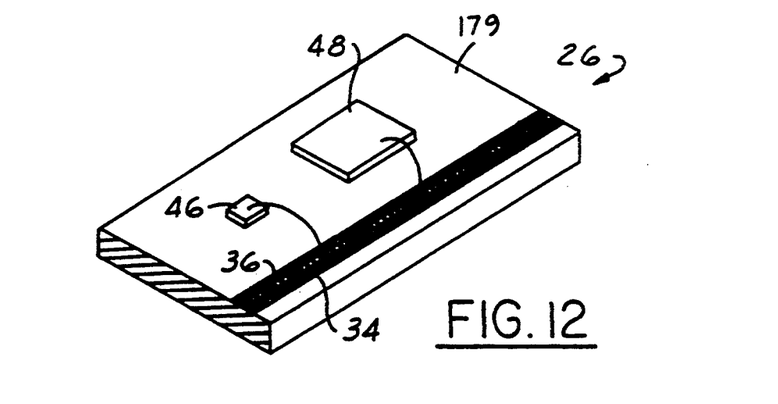
FIG. 12 is a top view of the detectors shown in FIG. 2.

Referring now to FIG. 12, there is shown a top view embodiment of the detector apparatus 26 of the preferred embodiment of this invention and corresponding substantially to that shown in FIG. 2. Specifically, detectors 46 and 48 are used in combination thereof to acquire an image from lens 50 and each providing signals of opposite polarity in response thereto onto bus 36 as hereinbefore described. The detectors 46 and 48 may be mounted upon a printed circuit board, such as 179, which would allow the detectors 46 and 48 to be relatively easily incorporated within the detector 10.

Figure 13:
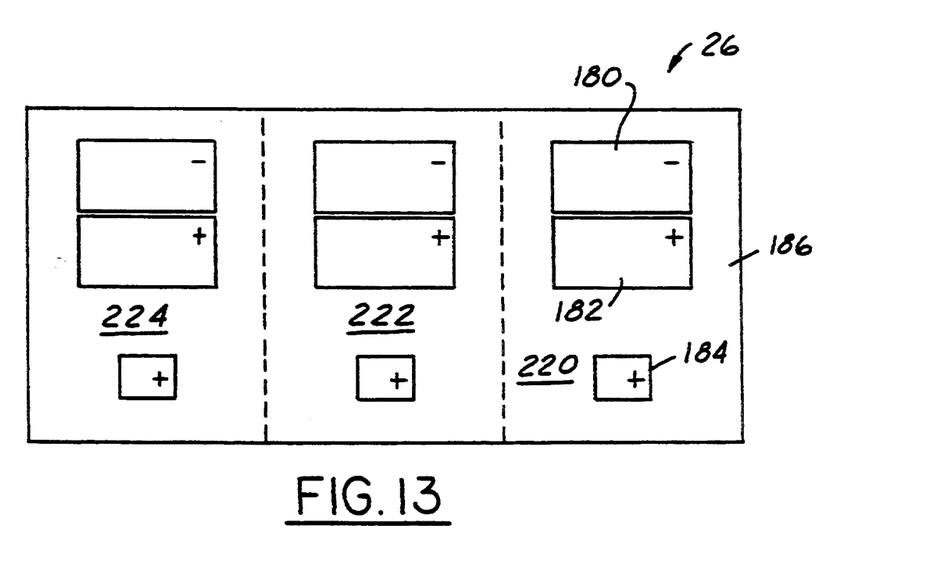
FIG. 13 is a third alternative embodiment of the detector portion of the object detector shown in FIG. 1.

Referring now to FIG. 13, there is shown a third embodiment of the detector apparatus 26 of the object detector 10 made in accordance with the teachings of the preferred embodiment of this invention and containing photodetectors 180, 182 and 184 which are separately spaced upon a surface 186. Photodetectors 180 and 182 substantially correspond to the detectors 46 and 48 respectively as shown in FIGS. 2 and 12. Detector 184 substantially corresponds to detector 48 since detector 184 produces a signal onto bus 36 having substantially the same plurality as that signal produced by the photodetector 48. The advantage in using the detector apparatus 26 configuration shown in FIG. 13 is that increased sensitivity of the detector 26 may be achieved for objects which are farther away from object detector 10 than was possible with the configurations shown in FIGS. 10, 11 and 12. This is due to the placement of the additional photodetector 184 at a spatial location which allows the detector 184 to receive image radiation from lens 50 corresponding to objects which are relatively far from lens 50. Therefore, an Excess Gain sculpturing is achieved with a relatively long threshold detecting distance. The sensitivity of the configuration of the detector apparatus 26, as shown in FIG. 13, is graphically shown in graph 190 of FIG. 14 and, as can be seen therefrom, produces a signal of relatively positive polarity at two different ranges across the detector apparatus 26. The strategic placement of the detector 180, 182 and 184 as shown in graph 190 has been seen to achieve the needed Excess Gain sculpturing.

Figure 14:
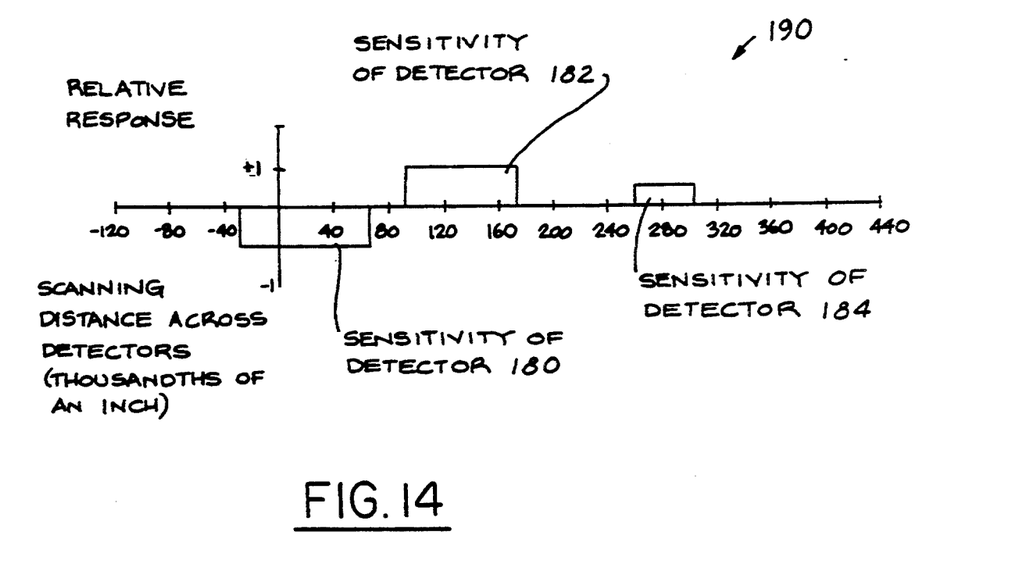
FIG. 14 is a graphical illustration of the sensitivity associated with the detector portion generally shown in FIG. 13.
Figure 15:
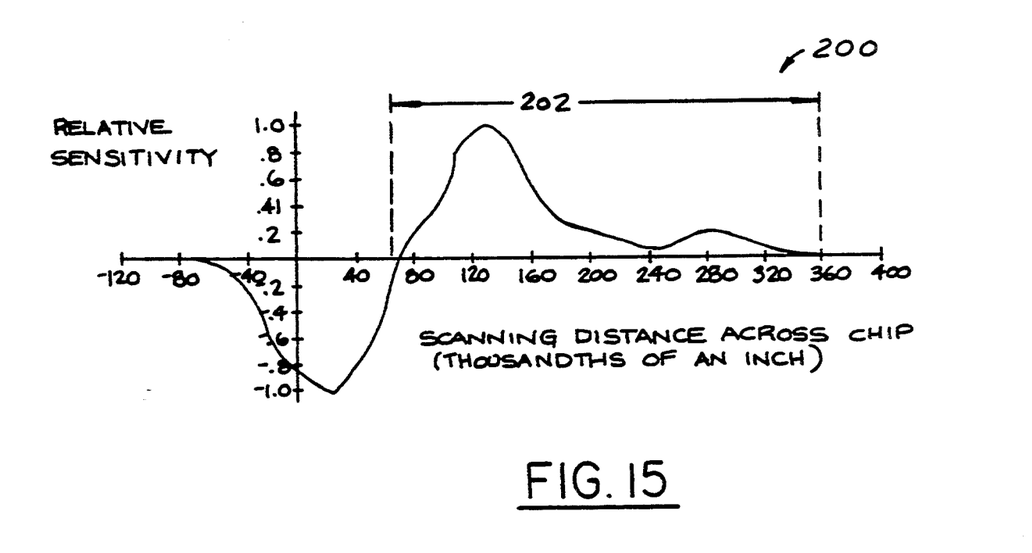
FIG. 15 is a graphical illustration of the mathemetical convolution of the sensitivity shown in FIG. 14 with the intensity of the reflected radiation received by the object detector shown in FIG. 1.

Referring now to FIG. 14, there is shown graph 200 which is the convolution of the sensitivity graph 190 with the previously calculated intensity function of the target object which was denoted as I(y,R). As can be seen from graph 200, a relatively larger distance 202 across the detector apparatus 26 produces a detected object than was possible with the sensitivity function as shown in graph 140 of FIG. 8, thereby increasing the threshold detecting distance of this embodiment.

Figure 16:
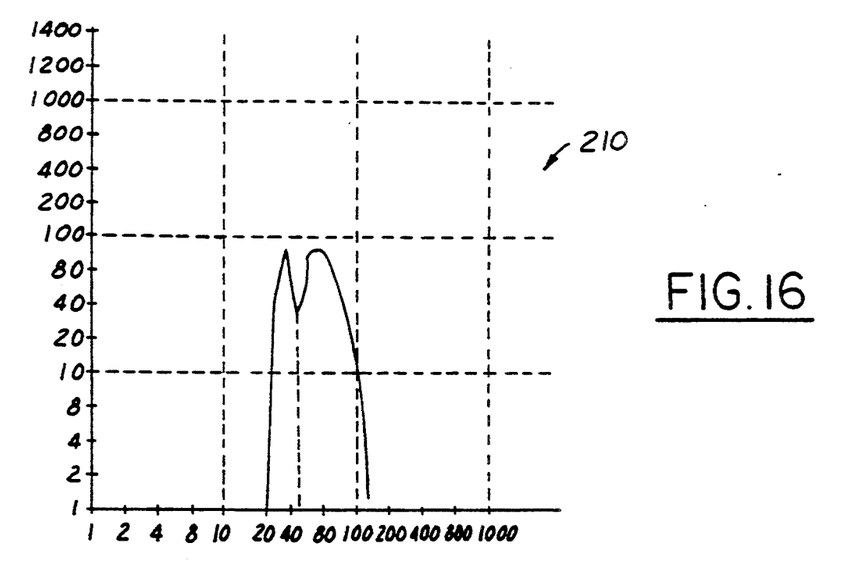
FIG. 16 is a graphical illustration of relationship of the Excess Gain and the range associated with the object detector shown in FIG. 1 and having a sensitivity as shown in FIG. 14.

The use of the detector apparatus 26 as shown in FIG. 13 then produces an Excess Gain graph 210 as shown in FIG. 16 having a decreased Excess Gain at a range 214 corresponding to relatively close distances to object detector 10 while having an increased gain range thereafter and defining a relatively larger threshold detection range than did the Excess Gain graph 152 or 150 as shown in FIG. 9. Therefore, the use of the photodetector 184 in conjunction with photodetectors 180 and 182, as shown in FIG. 13, allows for the sculpturing of the Excess Gain associated with detector apparatus 26 but also allows for objects to be detected by the detecting apparatus 26 which are relatively far in distance therefrom.

As further seen in FIG. 13, the detecting apparatus 26 may comprise a plurality of individual detection portions 220, 222 and 224 which are uniquely associated with a separate beam 18 which is generated from the emitter apparatus 24. That is, the emitter apparatus 24 may include a plurality of separate light-emitting diodes (such as light-emitting diode 42 of FIG. 2) each producing a separate beam 18 of radiation therefrom. Each of the detector portions 220, 222 and 224 may be configured so as to receive the portions 20 or 22 of the separately generated radiator beam 18. In this manner, the detector apparatus 26 may be configured so as to be efficiently packaged into a plurality of separate detector portions 220–224.

Figure 17:
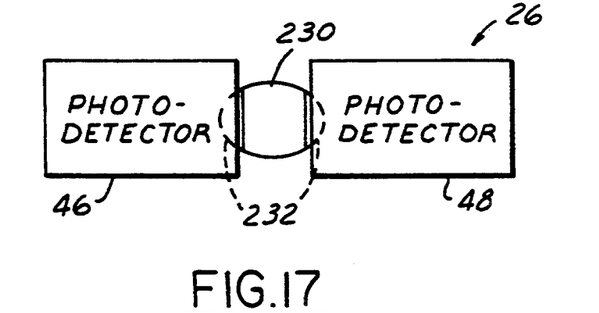
FIG. 17 is an illustration of one shape of the emitted radiation beam from the detector shown in FIG. 1.

Referring now to FIG. 17, there is shown a beam shaping technique resident within the invention. Specifically, detector apparatus 26 is shown as containing the previously discussed photodetectors 46 and 48. As previously explained, each of the photodetectors 46 and 48 produces a signal onto bus 36 having opposite polarity, when a portion of the reflected radiation 20 or 22 is impinged thereon. By uniquely configuration the shape of the radiated beam 18, it has been found that one may decrease the sensitivity of the overall detector apparatus 26. This decrease in sensitivity in certain ranges is achieved by choosing a flattened or dimpled geometric shape 230 instead of a substantially round shape 232. The use of such a dimpled shape 230 alleviates a "non-uniform target" problem. This "non-uniform target" problem is due to the object detector 10 making false detections of objects if the object image falls on the detector 46, and it corresponds to an area of relatively low reflectance, while the image appearing upon detector 48 falls in an area of relatively high reflectance. That is, the image upon detector 46 may be due to a highly reflective side marker while the image upon detector 48 may be due to a dark object. By flattening or dimpling the shape of the beam 20 as shown by the geometric shape 230, this problem is alleviated by reducing the depth of the region beyond the uniform target cut-off where a portion of the spot 230 is still imaged on the additive detector 48. That is, the differential between the reflectance of the low and high reflectance areas associated with that portion of the beam 20 appearing on photodetectors 46 and 48 respectively must be relatively large in order for a false detection to occur due to the use of this dimpled shape 230. This dimpled shape 230 then allows for a greater reflectance differential between areas upon an object to be detected since the beam 20 would have to be more closely placed upon photodetector 48 in order for a detecting signal to be generated. In effect, dimpling or reducing the overall height or diameter of the beam 20 makes the object detector system 10 more highly convergent.

Figure 18A:
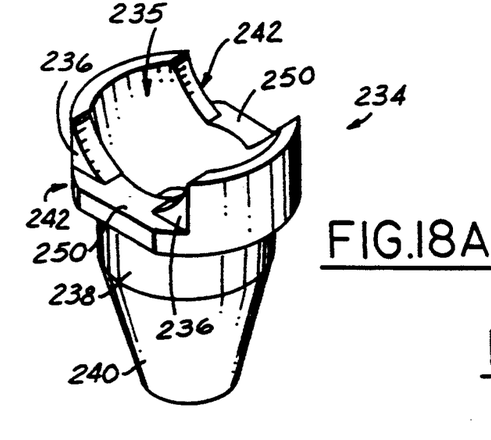
FIG. 18a is a perspective view of one form of the mounting elements for the generation portion of the object detector of the preferred embodiment of this invention.
Figure 18B:
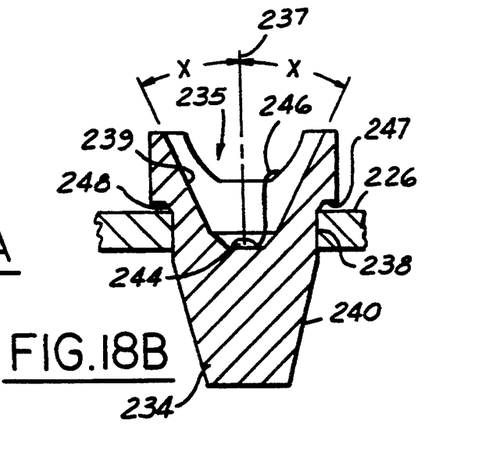
FIG. 18b is a cross-sectional view of the mounting element shown generally in FIG. 18a, shown mounted within a printed circuit board.

Reference is now made to FIGS. 18a–18d which depict the details of two versions 234, 234a of a mounting apparatus associated with the mounting of the light-emitting diode 42 within the emitter apparatus 24. A first version of the mounting element is depicted in FIGS. 18a, 18b, and 18e as simply denoted by the numeral 234. The mounting element 234 includes a cylindrical skirt 238 which is adapted to be tightly received within an aperture in a printed circuit board 226. A tapered portion 240 facilitates rapid centering and automatic insertion into the printed circuit board. A small chamber 248 between the skirt 238 and shoulder portion 247 engages the top of the printed circuit board and assists in ensuring proper centering and thus the mounting position of the mounting element 234. The upper portion of the mounting element 234 includes a central cavity 235 therein which is essentially symmetrical in one direction and altered to a central axis 237. Thus, cavity 235 is defined by a curved end walls 239 and a pair of generally straight walls 241. End walls 239 include a cut-out or scalloped portion 242 therebetween and a pair of spaced-apart, essentially flat surfaces 250 having flat flange portions 236. A light-emitting diode such as 42, herein denoted as 244, is mounted as by adhesives on a flat bottom surface within a cavity 235 in a central position coaxial with longitudinal axis 237. A fine electrical wire 246 is connected to the light-emitting diode 244 and extends upwardly and laterally through the cut-out portion 242 so as to be bondable to a printed circuit path on a printed circuit board 226.

As best seen in FIG. 18e, the geometry of the cavity 235 and related features seen in plan view are symmetrical about the axis 237. Thus, the light-emitting diode 244 produces a beam of infrared light energy which is essentially symmetric about the axis 237.

Figure 18C:
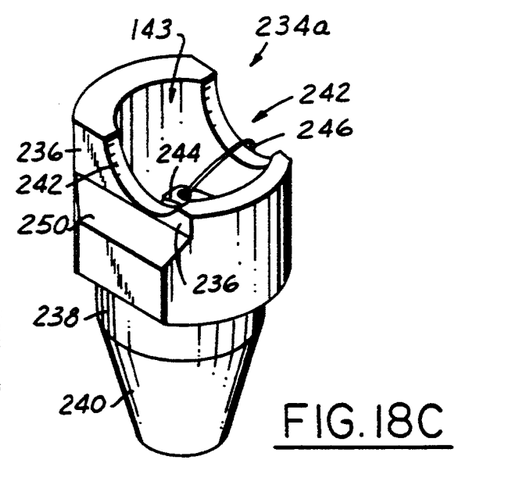
Figure 18D:
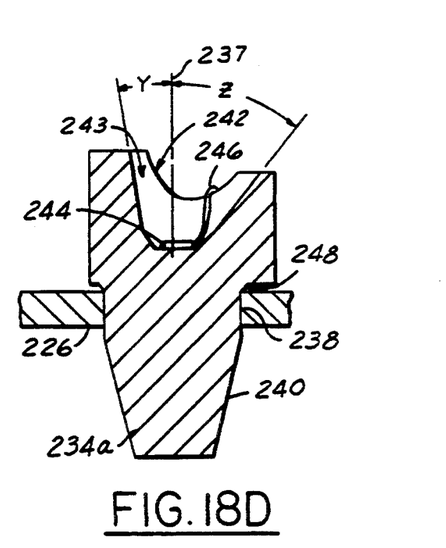
FIG. 18d is a cross-sectional view of the mounting element shown generally in FIG. 18c and depicted as mounted in a printed circuit board.
Figure 18E:
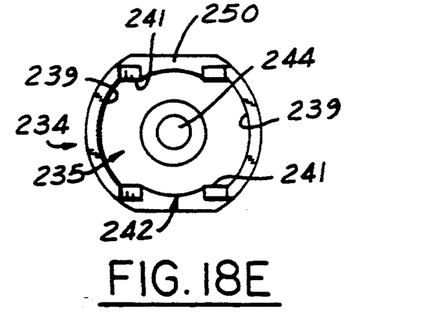
Figure 18F:
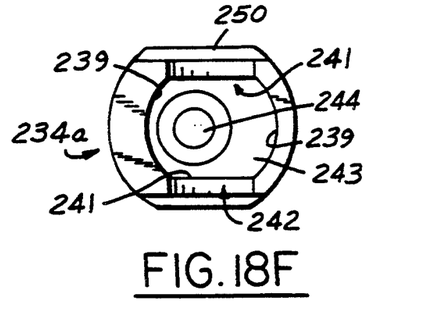
FIG. 18f is a plan view of the mounting element shown generally in FIG. 18c.

The alternative mounting arrangement 234a shown in FIGS. 18c, 18d and 18f is essentially similar to that shown in FIGS. 18a, 18b and 18e with the following exceptions. The inclination of the end walls 239 relative to the longitudinal axis 237 are different from each other, with one wall being inclined at an angle "y" and the other wall being inclined at a substantially greater angle "z," where "y" is less than the angle of "x" shown in FIG. 18b, and the angle of "z" is greater than the angle of "x." As a result of this latter-mentioned configuration, the beam 20 produced by the light-emitting diode 244 effectively emerges at an angle, here 15° relative to the longitudinal axis 137. Due to the geometry of the mounting elements 234, 234a and particularly the configuration of the end walls 239 and the flat sides 241, the resultant image applied to the photoresponsive sensors produces beams 20 which cam be directed toward the center of additional optics such as relay lenses (not shown). Additionally, the curved end walls 239 and generally straight side walls 241 of the mounting arrangements 234 and 234a provide for a dimpled beam 20, thereby reducing the "non-uniform target" problem as hereinbefore described. This produced beam 20 will have a general shape 230 as shown in FIG. 17. The flat flange portions of flat surface 250 also facilitate rotational indexing of an otherwise circular part, provide flat surfaces for handling by manual and automatic tools such as tweezers and robot grippers, and cause the formation of "scallops" which allow for the use of a shorter, relatively less expensive and more rugged bond wire from the hybrid circuit substrate upon printed circuit board 226 to the light-emitting diode 244.

It is to be understood that the invention is not limited to the exact construction or method illustrated and described above, but that various changes and modifications may be made without departing from the spirit and scope of the invention as defined in the following claims.

We claim:

1. An object detector for detecting the presence of an object reflecting a beam of radiation therefrom and located within a range of distances from said object detector, said object detector comprising:
   (a) acquisition means for acquiring said beam of radiation reflected by said object;
   (b) detecting means optically coupled to said acquisition means for receiving said beam of radiation reflected from said object and for generating a signal in response thereto; and
   (c) blocking means optically coupled to said acquisition means and to said detecting means for blocking a variable portion of a beam of radiation received by said detecting means, when said beam is reflected from an object located within said range of distances, said blocked portion increasing as the distance of said object from said object detector decreases.

2. The object detector of claim 1 wherein said detecting means comprises a photosensor.

3. The object detector of claim 1 wherein said acquisition means comprises a lens.

4. The object detector of claim 1 wherein said blocking means comprises a variable optical density filter.

5. The object detector of claim 1 wherein said blocking means comprises a mask.

6. The object detector of claim 1, further comprising generating means coupled to said detecting means for generating a beam of radiation therefrom into the field of view of the acquisition means for reflection by said object.

7. The object detector of claim 6, wherein said generation means comprises a light emitting diode.

8. The object detector of claim 7, wherein said generation means further comprises a second lens optically coupled to said light emitting diode.

9. An object detector for detecting objects located within a range of distances from the detector, comprising
   generating means for generating a focused beam of light energy,
   acquisition means, having a field of view that includes said beam, for acquiring the reflection of the beam from an object located within said range of distances,
   detecting means optically coupled to the acquisition means for receiving the acquired reflected beam and generating an output signal in response thereto, and
   reducing means optically coupled to the acquisition means for effecting a variable reduction in an output signal generated by the detecting means in response to the reception of an acquired beam reflected from an object, said reduction increasing as the distance of the detected object from the detector decreases.

10. The object detector of claim 9, wherein said detecting means comprises a photosensor.

11. The object detector of claim 9, wherein said acquisition means comprises a lens.

12. The object detector of claim 9, wherein said reducing means comprises a variable optical density filter for partially blocking said beam of radiation.

13. The object detector of claim 9, wherein said reducing means comprises a mask.

14. The object detector of claim 9, wherein said generating means comprises a light emitting diode.

15. The object detector of claim 14, wherein said generating means further comprises a second lens optically coupled to said light emitting diode.

* * * * *